United States Patent
Kato et al.

(10) Patent No.: US 7,931,558 B2
(45) Date of Patent: Apr. 26, 2011

(54) AUTOMATIC TRANSMISSION

(75) Inventors: Hiroshi Kato, Kariya (JP); Masaaki Nishida, Anjo (JP)

(73) Assignee: Aisin AW Co. Ltd., Aichi-ken (JP)

( * ) Notice: Subject to any disclaimer, the term of this patent is extended or adjusted under 35 U.S.C. 154(b) by 476 days.

(21) Appl. No.: 12/203,228

(22) Filed: Sep. 3, 2008

(65) Prior Publication Data
US 2009/0062056 A1  Mar. 5, 2009

(30) Foreign Application Priority Data
Sep. 4, 2007  (JP) .................................. 2007-229574

(51) Int. Cl.
*F16H 3/62*  (2006.01)
(52) U.S. Cl. ........................................ 475/275; 475/278
(58) Field of Classification Search .......... 475/275–278, 475/284, 296
See application file for complete search history.

(56) References Cited

U.S. PATENT DOCUMENTS
| | | | |
|---|---|---|---|
| 7,517,297 B2 * | 4/2009 | Tabata et al. ................. | 475/276 |
| 2002/0091032 A1 | 7/2002 | Hayabuchi et al. | |
| 2003/0186775 A1 * | 10/2003 | Ishimasu et al. .............. | 475/275 |
| 2005/0026739 A1 | 2/2005 | Ishimaru | |
| 2006/0142112 A1 | 6/2006 | Kamada et al. | |
| 2009/0011893 A1 * | 1/2009 | Kato et al. ..................... | 475/276 |
| 2009/0118064 A1 * | 5/2009 | Choi ............................. | 475/278 |

FOREIGN PATENT DOCUMENTS
| | | |
|---|---|---|
| JP | 2002-206601 A | 7/2002 |
| JP | 2004-353713 A | 12/2004 |
| JP | 2005-042790 A | 2/2005 |
| JP | 2007-024303 A | 2/2007 |
| JP | 2007-057084 A | 3/2007 |

* cited by examiner

*Primary Examiner* — Ha D. Ho
(74) *Attorney, Agent, or Firm* — Sughrue Mion, PLLC (57) ABSTRACT

An automatic transmission which can establish properly separated gear ratios of forward ten gears or eleven gears and reverse two gears, which is simple and compact and can comfortably change gears. A fourth sun gear of a speed-changing dual planetary gear is connected to a speed-reducing common ring gear of a speed-reducing dual planetary gear through a first clutch, a speed-changing common carrier is connected to an input shaft through a second clutch and is selectively fixed by a second brake. A third sun gear of the speed-changing dual planetary gear is connected to the speed-reducing common ring gear of the speed-reducing dual planetary gear through a third clutch, connected to the speed-changing common carrier through a fourth clutch, and selectively to a first sun gear through a fifth clutch, and is selectively fixed through a first brake. A speed-changing common ring gear is directly connected to an output shaft.

10 Claims, 8 Drawing Sheets

| | C-1 | C-2 | C-3 | C-4 | C-5 | B-1 | B-2 | F-1 | GEAR RATIO | STEP |
|---|---|---|---|---|---|---|---|---|---|---|
| 1st | ● | – | – | – | – | – | ▲ | ● | 5.320 | 1.378 |
| 2nd | ● | – | – | – | ● | – | – | – | 3.861 | 1.336 |
| 3rd | ● | – | – | – | – | ● | – | – | 2.890 | 1.488 |
| 4th | ● | – | ● | – | – | – | – | – | 1.942 | 1.309 |
| 5th | ● | – | – | ● | – | – | – | – | 1.483 | 1.221 |
| 6th | ● | ● | – | – | – | – | – | – | 1.215 | 1.215 |
| 7th | – | ● | ● | – | – | – | – | – | 1.000 | 1.189 |
| 8th | – | ● | – | ● | – | – | – | – | 0.841 | 1.169 |
| 9th | – | ● | – | – | ● | ● | – | – | 0.719 | 1.145 |
| 10th | – | ● | – | – | – | – | – | – | 0.628 | |
| REV1 | – | – | ● | – | – | – | ● | – | 4.979 | |
| REV2 | – | – | – | ● | – | – | ● | – | 2.564 | |

● : ENGAGED
▲ : ENGAGED WHEN ENGINE IS USED AS BRAKE $\lambda 0 = 0.320$  $\lambda 1 = 0.485$
$\lambda 2 = 0.390$  $\lambda 3 = 0.365$

| | C-1 | C-2 | C-3 | C-4 | C-5 | B-1 | B-2 | F-1 | GEAR RATIO | STEP |
|---|---|---|---|---|---|---|---|---|---|---|
| 1st | – | – | – | – | ● | – | ▲ | ● | 4.973 | 1.288 |
| 2nd | ● | – | – | – | ● | – | – | – | 3.861 | 1.336 |
| 3rd | ● | – | – | – | – | ● | – | – | 2.890 | 1.488 |
| 4th | ● | – | ● | – | – | – | – | – | 1.942 | 1.309 |
| 5th | ● | – | – | ● | – | – | – | – | 1.483 | 1.221 |
| 6th | ● | ● | – | – | – | – | – | – | 1.215 | 1.215 |
| 7th | – | ● | ● | – | – | – | – | – | 1.000 | 1.189 |
| 8th | – | ● | – | ● | – | – | – | – | 0.841 | 1.169 |
| 9th | – | ● | – | – | ● | ● | – | – | 0.719 | 1.145 |
| 10th | – | ● | – | – | – | – | – | – | 0.628 | |
| REV1 | – | – | ● | – | – | – | ● | – | 4.979 | |
| REV2 | – | – | – | ● | – | – | ● | – | 2.564 | |

● : ENGAGED
▲ : ENGAGED WHEN ENGINE IS USED AS BRAKE $\lambda 0 = 0.320$    $\lambda 1 = 0.485$
$\lambda 2 = 0.390$    $\lambda 3 = 0.365$

| | C-1 | C-2 | C-3 | C-4 | C-5 | B-1 | B-2 | F-1 | GEAR RATIO | STEP |
|---|---|---|---|---|---|---|---|---|---|---|
| 1st | – | – | – | – | ● | – | ▲ | ● | 6.069 | 1.115 |
| 2nd | ● | – | – | – | – | – | ▲ | ● | 5.442 | 1.474 |
| 3rd | ● | – | – | – | ● | – | – | – | 3.691 | 1.286 |
| 4th | ● | – | – | – | – | ● | – | – | 2.870 | 1.506 |
| 5th | ● | – | – | – | – | – | – | – | 1.905 | 1.304 |
| 6th | ● | – | – | ● | – | – | – | – | 1.460 | 1.218 |
| 7th | ● | ● | – | – | – | – | – | – | 1.199 | 1.199 |
| 8th | – | ● | – | ● | – | – | – | – | 1.000 | 1.178 |
| 9th | – | ● | ● | – | – | – | – | – | 0.849 | 1.167 |
| 10th | – | ● | – | – | ● | ● | – | – | 0.727 | 1.120 |
| 11th | – | ● | – | – | – | – | – | – | 0.649 | |
| REV1 | – | – | ● | – | – | – | ● | – | 5.079 | |
| REV2 | – | – | – | ● | – | – | ● | – | 2.667 | |

● : ENGAGED
▲ : ENGAGED WHEN ENGINE IS USED AS BRAKE $\lambda 0 = 0.330$  $\lambda 1 = 0.475$
$\lambda 2 = 0.375$  $\lambda 3 = 0.350$

AUTOMATIC TRANSMISSION

CROSS-REFERENCE TO RELATED APPLICATIONS

This application claims priority from Japanese Patent Application No. 2007-229574 filed on Sep. 4, 2007 the disclosure of which, including the specification, drawings and abstract, is incorporated herein by reference in its entirety.

BACKGROUND

1. Technical Field

Apparatuses consistent with the present invention relate to an automatic transmission for changing the revolutions of an input shaft driven rotationally by a prime mover or the like of an automobile, to a plurality of gears.

2. Description of Related Art

In JP-A-2007-24303 (Paragraphs [0715]-[0718], and FIG. 125 and FIG. 126) (hereinafter "Patent Document 1"), there is disclosed an automatic transmission comprising: an input shaft; a speed-reducing dual planetary gear including a speed-reducing common carrier fixed in a transmission case for bearing a stepped pinion, a first sun gear meshing with the diametrically-larger pinion portion of the stepped pinion and connected directly to the input shaft, a second sun gear meshing with a diametrically-smaller pinion portion, and a speed-reducing common ring gear meshing with the diametrically-smaller pinion portion; a speed-changing dual planetary gear including a third carrier for bearing a pair of pinions meshing with each other, a third sun gear meshing with one pinion of the paired pinions, a third ring gear meshing with the other pinion, a fourth carrier connected directly to the third ring gear for bearing the pinions, a fourth sun gear meshing with the pinions and connected directly to the third carrier, and a fourth ring gear meshing with the pinions and connected directly to an output shaft; an output shaft connected directly to the fourth ring gear; a first clutch for connecting the second sun gear and the third sun gear selectively; a second clutch for connecting the fourth carrier selectively to the input shaft; a third clutch for connecting the second sun gear selectively to the third carrier; a fourth clutch for connecting the fourth sun gear selectively to the input shaft; a fifth clutch for connecting the first ring gear selectively to the third carrier; a first brake for fixing the third carrier selectively; and a second brake for fixing the third ring gear and the fourth carrier connected directly, selectively, whereby the revolutions of the input shaft are changed to forward ten gears and reverse two gears and transmitted to the output shaft.

In JP-A-2007-57084 (Paragraphs [0118]-[0120], and [0149]-[0163], and FIG. 15 and FIG. 18) (hereinafter "Patent Document 2"), on the other hand, there is disclosed an automatic transmission comprising: an input shaft; a speed-reducing dual planetary gear including a first carrier fixed in a transmission case for bearing a first pinion, a first sun gear meshing with the first pinion, a first ring gear meshing with the first pinion, a second carrier bearing second and third pinions meshing with each other and connected directly to the input shaft and the first sun gear, a second sun gear meshing with a second pinion and connected directly to the first carrier, and a second ring gear meshing with the third pinion; a speed-changing dual planetary gear including speed-changing common carrier for bearing a long pinion and a fourth pinion meshing with the long pinion rotatably and for being connected to the input shaft, a third sun gear meshing with the long pinion, a fourth sun gear meshing with the fourth pinion, and a speed-changing common ring gear meshing with the long pinion; an output shaft connected directly to the speed-changing common ring gear; a first clutch for connecting the second ring gear and the fourth sun gear selectively; a second clutch for connecting the input shaft and the speed-changing common carrier selectively; a third clutch for connecting the second ring gear and the third sun gear selectively; a fourth clutch for connecting the second carrier and the third sun gear selectively; a fifth clutch for connecting the first ring gear and the third sun gear selectively; a first brake for fixing the third sun gear selectively; and a second brake for fixing the speed-changing common carrier selectively, whereby the revolutions of the input shaft are changed to forward ten gears and reverse two gears and are transmitted to the output shaft.

In recent years, multiples gears are desired for an automatic transmission to improve the mileage and the power transmission efficiency or to acquire the gear ratios matching the tastes of the driver. These desires for the automatic transmission are addressed by the automatic transmissions disclosed in Patent Documents 1 and 2, which can acquire the gear ratios of forward ten gears and reverse two gears. In the automatic transmission described in Patent Document 1, however, the speed-changing dual planetary gear is constituted to include a third carrier for bearing a pair of pinions meshing with each other, a third sun gear meshing with one pinion of the paired pinions, a third ring gear meshing with the other pinion, a fourth carrier connected directly to the third ring gear for bearing the pinions, a fourth sun gear meshing with the pinions and connected directly to the third carrier, and a fourth ring gear meshing with the pinions and connected directly to an output shaft. As a result, the automatic transmission has its axial length enlarged and its parts number increased to raise the cost. In the automatic transmission disclosed in Patent Document 1, moreover, as apparent from the gear ratios of the individual gears shown in FIG. 126, the differences are large between the individual steps, which are calculated by dividing the gear ratios of n gears by the gear ratios of (n+1) gears. The step between the first gear and the second gear is so high at 1.511 as may cause speed-changing shocks. The step between the ninth gear and the tenth gear is at 1.131 so close to 1 as may cause a poor speed change. Thus, the driver cannot attain a preferable feeling of little dispersion all over the ten gears.

In the automatic transmission described in Patent Document 2, on the other hand, the speed-reducing dual planetary gear is constituted to include a first carrier fixed in a transmission case for bearing a first pinion, a first sun gear meshing with the first pinion, a first ring gear meshing with the first pinion, a second carrier bearing second and third pinions meshing with each other and connected directly to the first sun gear and the input shaft, a second sun gear meshing with a second pinion and connected directly to the first carrier, and a second ring gear meshing with the third pinion. As a result, the automatic transmission has its axial length enlarged and its parts number increased to raise the cost. In the automatic transmission disclosed in Patent Document 2, moreover, as apparent from the gear ratios of the individual gears shown in FIG. 18, the differences are large between the individual steps. The step between the first gear and the second gear is so high at 1.688 as may cause speed-changing shocks. The step between the ninth gear and the tenth gear is at 1.122 so close to 1 as may cause a poor speed change. Thus, the driver cannot attain a preferable feeling of little dispersion, as might otherwise result from the speed change, all over the ten gears.

In order to address demands for reducing the size and weight, for matching the lower cost and for achieving multiple gears while spacing the gear ratios of adjoining gears properly, therefore, the has been a long-felt but unresolved need to develop an automatic transmission which is simple and compact in constitution and which can change the gears with a comfortable feeling.

SUMMARY

Exemplary embodiments of the present invention have been conceived to address the above-mentioned needs and disadvantages, and other needs and disadvantages not described above, by providing an automatic transmission, which can establish properly separated gear ratios of forward ten gears or eleven gears and reverse two gears, which is simple and compact in constitution and which can change the gears with a comfortable feeling. Also, the present invention is not required to address the needs and disadvantages described above, and exemplary embodiments of the present invention may not overcome any of the problems described above.

According to an aspect of the present invention, an automatic transmission includes an input shaft; a speed-reducing dual planetary gear including a speed-reducing common carrier bearing rotatably a stepped pinion having a diametrically-larger pinion portion and a diametrically-smaller pinion portion formed and a first pinion meshing with the diametrically-smaller pinion and connected directly to the input shaft, a first sun gear meshing with the diametrically-larger pinion portion, a second sun gear meshing with the diametrically-smaller pinion portion, and a speed-reducing common ring gear meshing with the first pinion; a speed-changing dual planetary gear including a speed-changing common carrier bearing rotatably a long pinion and a second pinion meshing with the long pinion and capable of being connected to the input shaft, a third sun gear meshing with the long pinion, a fourth sun gear meshing with the second pinion, and a speed-changing common ring gear meshing with the long pinion; an output shaft connected directly to the speed-changing common ring gear; a first clutch for connecting the speed-reducing common ring gear and the fourth sun gear selectively; a second clutch for connecting the input shaft and the speed-changing common carrier selectively; a third clutch for connecting the speed-reducing common ring gear and the third sun gear selectively; a fourth clutch for connecting the speed-reducing common carrier and the third sun gear selectively; a fifth clutch for connecting the first sun gear and the third sun gear selectively; a first brake for fixing the third sun gear selectively; and a second brake for fixing the speed-changing common carrier selectively.

Consistent with aspects of the present invention, a fourth sun gear of a speed-changing dual planetary gear is selectively connected to a speed-reducing common ring gear of a speed-reducing dual planetary gear through a first clutch, a speed-changing common carrier is connected to an input shaft through a second clutch and is selectively fixed by a second brake. A third sun gear of the speed-changing dual planetary gear is selectively connected to the speed-reducing common ring gear of the speed-reducing dual planetary gear through a third clutch, selectively connected to the speed-changing common carrier through a fourth clutch, and selectively to a first sun gear through a fifth clutch, and is selectively fixed through a first brake and a speed-changing common ring gear is directly connected to an output shaft.

According to aspects of the present invention, therefore, both the speed-reducing and speed-changing dual planetary gears are the dual planetary gears of the aforementioned constitutions, in which the two carriers are made common and in which the two ring gears are made common, although the numbers of gears are as large as the forward ten gears or eleven gears and the reverse two gears. As a result, an automatic transmission consistent with aspects of the present invention can have its parts number decreased to simplify the constitution and to reduce the axial length. Moreover, consistent with aspects of the present invention, it is possible to provide an automatic transmission which is enabled to set all the step ratios of the individual gears to proper magnitudes by using the ordinary usable tooth number settings and which can set the forward ten gears capable of using the desired revolution number ranges for the engine effectively.

BRIEF DESCRIPTION OF THE DRAWINGS

The aspects of the present invention will become more apparent by describing in detail exemplary embodiments thereof with reference to the accompanying drawings, in which.

DETAILED DESCRIPTION OF EXEMPLARY EMBODIMENTS

Figure 1:
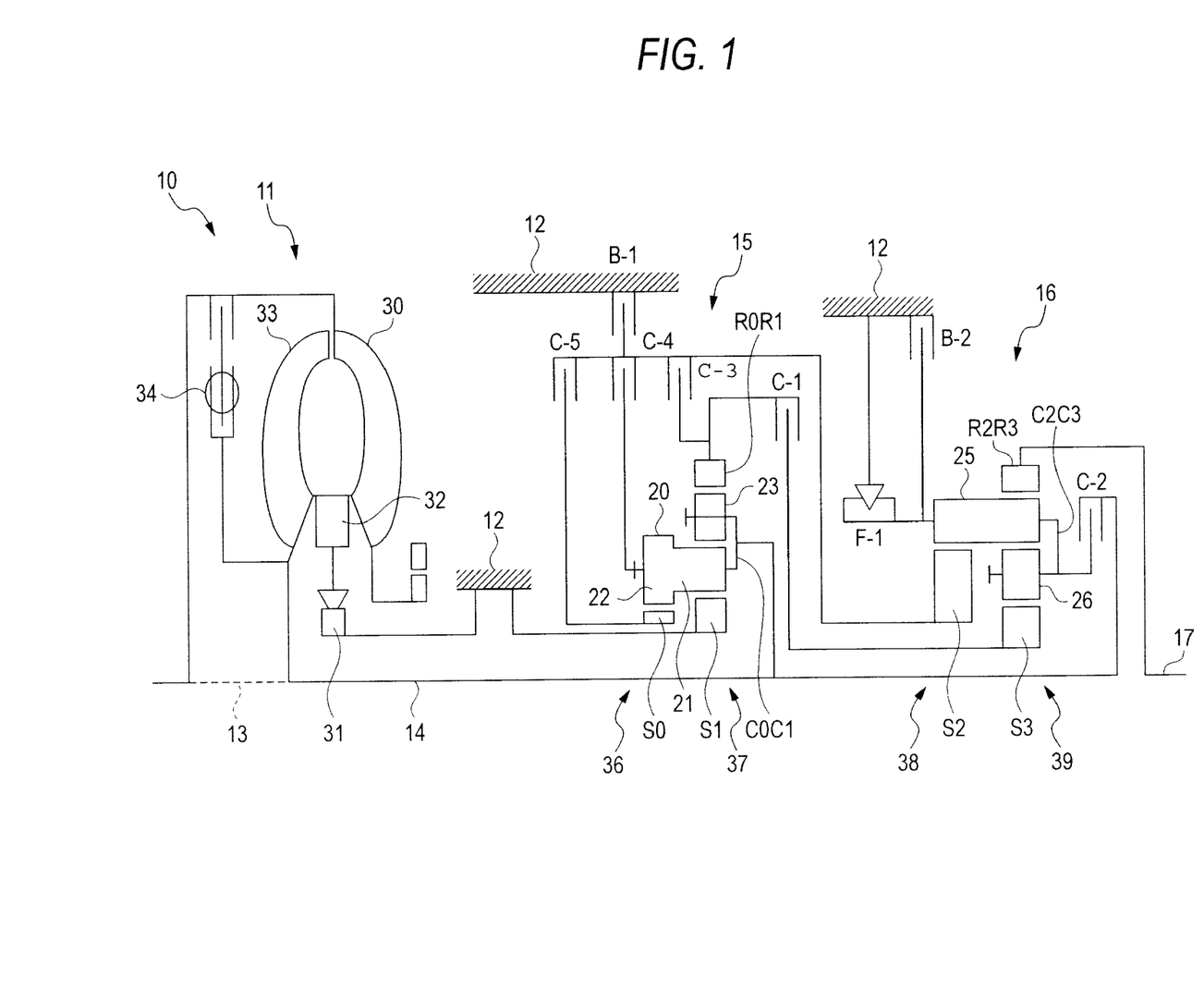
FIG. 1 is a schematic diagram showing an automatic transmission according to a first exemplary embodiment of the present invention.

An automatic transmission according to exemplary embodiments of the present invention are described below with reference to the drawings. An automatic transmission 10, according to a first exemplary embodiment of the present invention as shown in FIG. 1, is used to change the speeds of the output revolutions of a fluid torque converter 11, which is rotationally driven by the engine of an automobile, for example, to transmit the speed-changed revolutions to drive wheels. The automatic transmission 10 is constituted to include an input shaft 14, a speed-reducing dual planetary gear 15, a speed-changing dual planetary gear 16, an output shaft 17, first, second, third, fourth and fifth clutches C-1, C-2, C-3, C-4 and C-5, first and second brakes B-1 and B-2, and a one-way clutch F-1.

The speed-reducing dual planetary gear 15 is constituted to include a speed-reducing common carrier C0C1, which bears rotatably a stepped pinion 20 having a diametrically-larger pinion portion 22 and a diametrically-smaller pinion portion 21 and a first pinion 23 meshing with the diametrically-smaller pinion portion 21 and which is directly connected to the input shaft 14, a first sun gear S0 meshing with the diametrically-larger pinion portion 22, a second sun gear S1 meshing with the diametrically-smaller pinion portion 21, and a speed-reducing common ring gear R0R1 meshing with the first pinion 23.

The speed-changing dual planetary gear 16 is constituted to include a speed-changing common carrier C2C3, which bears rotatably a second pinion 26 meshing with the long pinion 25 and which can be connected to the input shaft 14, a third sun gear S2 meshing with the long pinion 25, a fourth sun gear S3 meshing with the second pinion 26, and a speed-changing common ring gear R2R3 meshing with the long pinion 25.

In the speed-reducing dual planetary gear 15, the second sun gear S1 is fixed in the transmission case 12, and the speed-reducing common carrier C0C1 is directly connected to the input shaft 14.

In the speed-changing dual planetary gear 16, the speed-changing common ring gear R2R3 is directly connected to the output shaft 17. The fourth sun gear S3 of the speed-changing dual planetary gear 16 is selectively connected to the speed-reducing common ring gear R0R1 of the speed-reducing dual planetary gear 15 through the first clutch C-1. The speed-changing common carrier C2C3 is selectively connected to the input shaft 14 through the second clutch C-2, but is selectively fixed through the second brake B-2, and is connected to the case 12 through the one-way clutch F-1 arranged in parallel with the second brake B-2, so that it is blocked from reverse revolutions. The third sun gear S2 of the speed-changing dual planetary gear 16 is selectively connected to the speed-reducing common ring gear R0R1 of the speed-reducing dual planetary gear 15 through the third clutch C-3 and to the speed-reducing common carrier C0C1 through the fourth clutch C-4, and is connected to the first sun gear SO through the fifth clutch C-5, but is selectively fixed through the first brake B-1.

Here, the pump impeller 30 of the fluid torque converter 11 is rotationally driven by the engine (not-shown) to feed out the oil, and a stator (not shown), as borne in the case 12 through a one-way clutch 31, receives the reaction of the oil thereby to generate a torque at a turbine 33. The input shaft 14 is directly connected to the turbine 33. Reference numeral 34 designates a lockup clutch capable of connecting the pump impeller 30 and the turbine 33.

Figure 2:
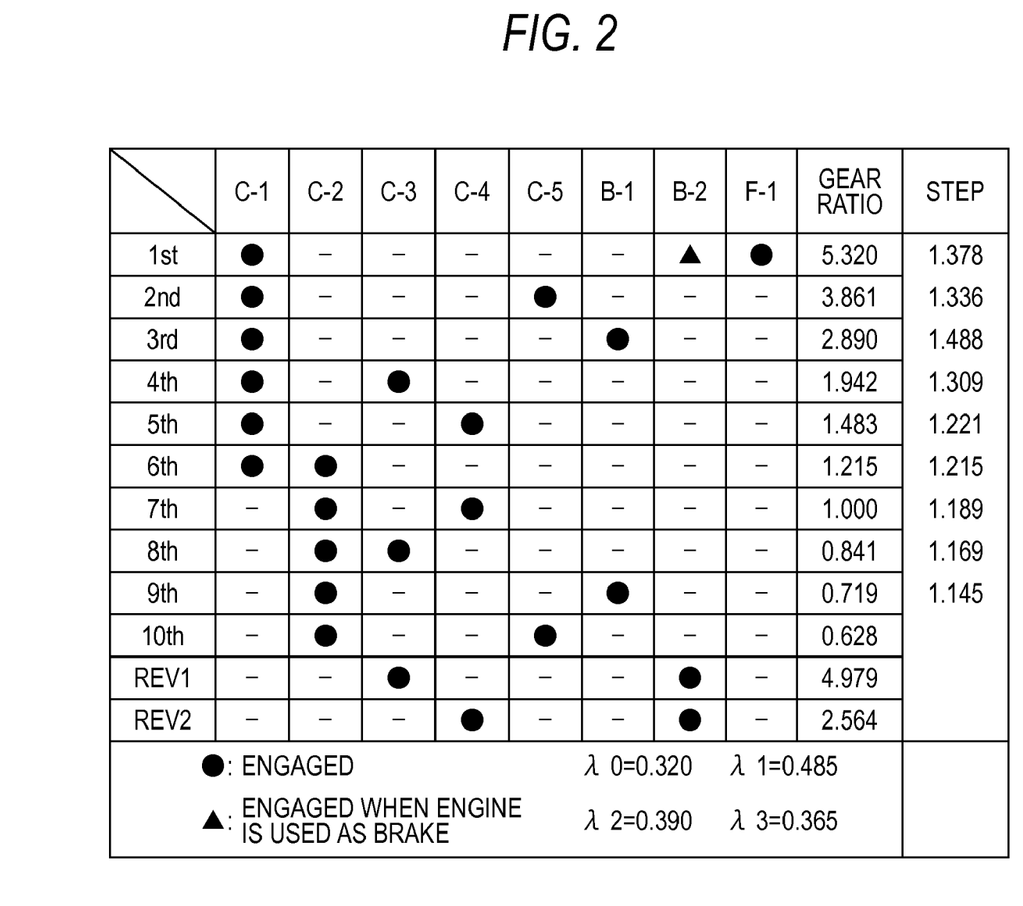
FIG. 2 is a diagram showing an operation table of brakes and clutches at individual gears of the first exemplary embodiment of the present invention.

The automatic transmission 10 thus constituted can establish ten forward gears and two reverse gears by engaging the first to fifth clutches C-1 to C-5 selectively, by engaging the first and second brakes B-1 and B-2 selectively, and by connecting or fixing the individual elements of the input shaft 14, the output shaft 17, the speed-reducing dual planetary gear 15 and the speed-changing dual planetary gear 16 selectively. In the operation table according to the first exemplary embodiment, as shown in FIG. 2, where the columns corresponding to the individual gears of the first to fifth clutches C-1 to C-5, the first and second brakes B-1 and B-2 and the one-way clutch F-1 are designated by ●, it is indicated that the clutches are engaged to the connected states, and that the brakes are engaged to the fixed states, respectively. On the other hand, where the columns are designated by ▲, it is indicated that the brake B-2 is engaged when the engine is used as a brake.

In a first double-pinion planetary gear 36 constituted to include the first sun gear S0 of the speed-reducing dual planetary gear 15, the speed-reducing common carrier C0C1 bearing the stepped pinion 20 and the first pinion 23, and the speed-reducing common ring gear R0R1 meshing with the first pinion 23 and through the diametrically-larger pinion portion 22 to the first sun gear S0; a second double-pinion planetary gear 37 constituted to include the second sun gear S1 of the speed-reducing dual planetary gear 15, the speed-reducing common carrier C0C1 bearing the stepped pinion 20 and the first pinion 23, and the speed-reducing common ring gear R0R1 meshing with the first pinion 23 and with the second sun gear S1 through the diametrically-smaller pinion portion 21; and a fourth double-pinion planetary gear 39 constituted to include the fourth sun gear S3 of the speed-changing dual planetary gear 16, the speed-changing common carrier C2C3 bearing a second pinion 26 and a long pinion 25 meshing with each other, and the speed-changing common ring gear R2R3 meshing with the long pinion 25 and with the fourth sun gear S3 through the second pinion 26, the relations among the revolution number Ns of the sun gear, the revolution number Nc of the carrier, the revolution number Nr of the ring gear and the gear ratios λ of the double-pinion planetary gears are expressed by Formula (1) (shown below).

In a third single-pinion planetary gear 38 constituted to include the third sun gear S2 of the speed-changing dual planetary gear 16, the speed-changing common carrier C2C3 bearing the long pinion 25 and the second pinion 26, and the speed-changing common ring gear R2R3 meshing with the third sun gear S2 through the long pinion 25, the relations among the revolution number Ns of the sun gear, the revolution number Nc of the carrier, the revolution number Nr of the ring gear and the gear ratios λ of the single-pinion planetary gear are expressed by Formula (2) (shown below). The gear ratios at the individual gears of the automatic transmission 10 are calculated on the basis of Formulas (1) and (2).

If the tooth numbers of the sun gears S0, S1 and S3 of the first, second and fourth double-pinion planetary gears 36, 37 and 39 are designated by Zs0, Zs1 and Zs3, if the tooth numbers of the ring gears R0, R1 and R3 are designated by Zr0, Zr1 and Zr3, if the tooth number of the sun gear S2 and of the third single-pinion planetary gear 38 are designated by Zs2, and if the tooth number of the ring gear R2 is designated by Zr2, then the gear ratios of the first, second and fourth double-pinion planetary gears 36, 37 and 39 and the third single-pinion planetary gear 38 are expressed by λ0=Zs0/Zr0, λ1=Zs1/Zr1, λ3=Zs3/Zr3 and λ2=Zs2/Zr2.

$$Nr = (1-\lambda)Nc + \lambda Ns \quad \text{(Formula 1)}$$

$$Nr = (1+\lambda)Nc - \lambda Ns \quad \text{(Formula 2)}$$

Figure 3:
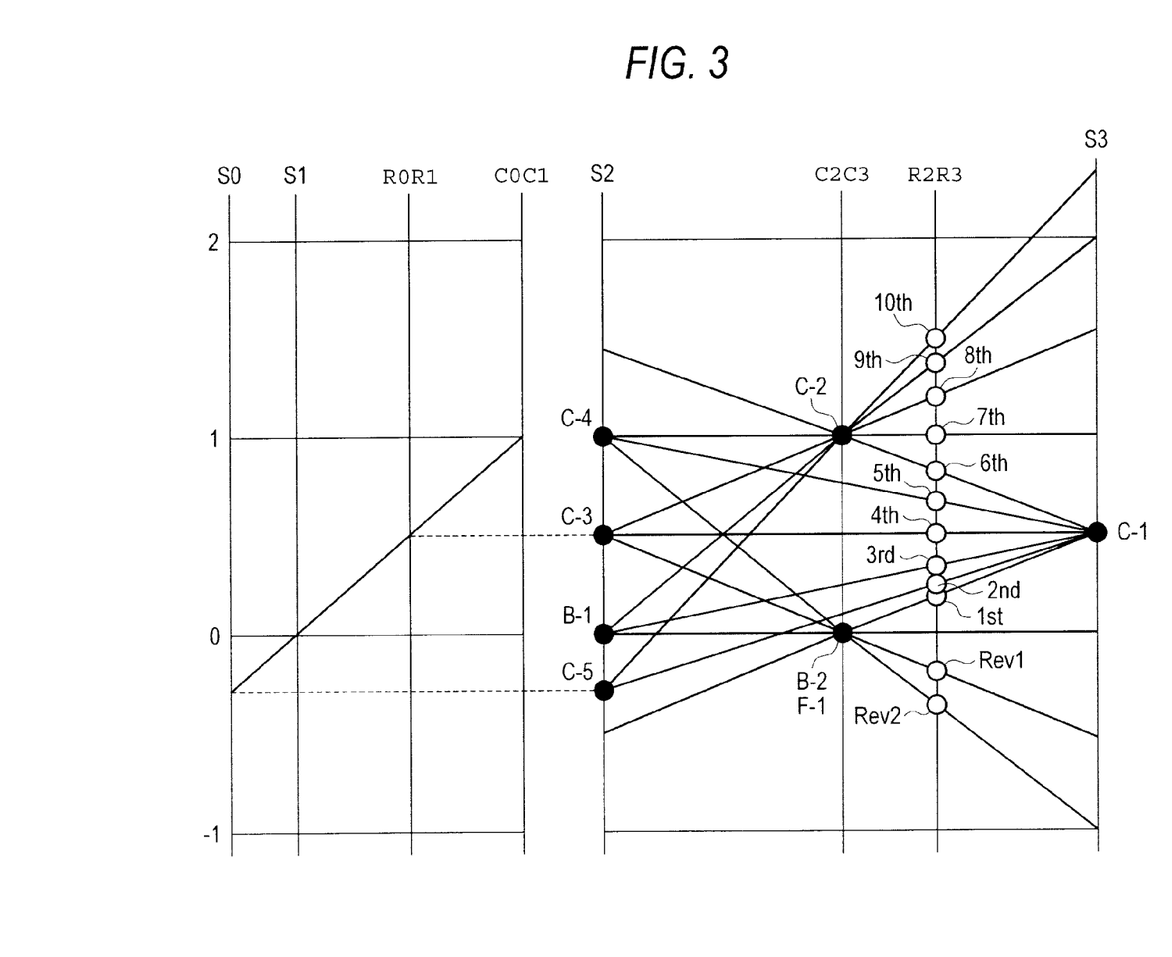
FIG. 3 is a speed diagram showing the revolution ratios of the individual elements of a planetary gear at the individual gears of the first exemplary embodiment of the present invention.

When the first to fifth clutches C-1 to C-5 are selectively engaged, and when the first and second brakes B-1 and B-2 are selectively engaged, the individual elements of the speed-reducing and speed-changing dual planetary gears 15 and 16 have the speed ratios, as illustrated in the speed diagram consistent with the first exemplary embodiment, as shown in FIG. 3. In this speed diagram, the individual elements, as composed of the sun gears, the carriers and the ring gears of the planetary gears, are arranged in the direction of the axis of abscissa at spacings corresponding to the gear ratios, and their speed ratios are taken to correspond to the individual elements in the direction of the axis of ordinate. As shown in FIG. 3, the speed diagrams of the speed-reducing and speed-changing dual planetary gears 15 and 16 are juxtaposed to each other. In the speed-reducing dual planetary gear 15, the speed ratios of the first sun gear S0, the second sun gear S1, the speed-reducing common ring gear R0R1 and the speed-reducing common carrier C0C1 are expressed on the individual ordinates, which are designated by S0, S1, R0R1 and C0C1, respectively. In the speed-changing dual planetary gear 16, the speed ratios of the third sun gear S2, the speed-changing common carrier C2C3, the speed-changing common ring gear R2R3 and the fourth sun gear S3 are expressed on the individual ordinates which are designated by S2, C2C3, R2R3 and S3, respectively.

In the first and second double-pinion planetary gears 36 and 37 of the speed-reducing dual planetary gear 15, the spacings between the ordinates of the first sun gear S0 and the second sun gear S1 and the ordinate of the speed-reducing common carrier C0C1 are individually assumed to be at 1, and the ordinate of the speed-reducing common ring gear R0R1 is spaced by gear ratios $\lambda 0$ and $\lambda 1$ on the same side of the ordinates of the first and second sun gears S0 and S1 individually from the ordinate of the speed-reducing common carrier C0C1.

In the fourth double-pinion planetary gear 39 of the speed-changing dual planetary gear 16, the spacing between the ordinate of the fourth sun gear S3 and the ordinate of the speed-changing common carrier C2C3 is assumed to be at 1, and the ordinate of the speed-changing common ring gear R2R3 is spaced only by a gear ratio $\lambda 4$ on the same side of the ordinate of the fourth sun gear S3 from the ordinate of the speed-changing common carrier C2C3. In the third single-pinion planetary gear 38, the spacing between the ordinate of the third sun gear S2 and the ordinate of the speed-changing common carrier C2C3 is assumed to be at 1, and the ordinate of the speed-changing common ring gear R2R3 is spaced only by a gear ratio $\lambda 3$ on the opposite side of the ordinate of the third sun gear S2 from the ordinate of the speed-changing common carrier C2C3.

In the speed diagram shown in FIG. 3, the letters C-1 to C-5, B-1 and B-2, and F-1 are written at the points where the first to fifth clutches C-1 to C-5, the first and second brakes B-1 and B-2 and the one-way clutch F-1 are selectively actuated.

Figure 4:
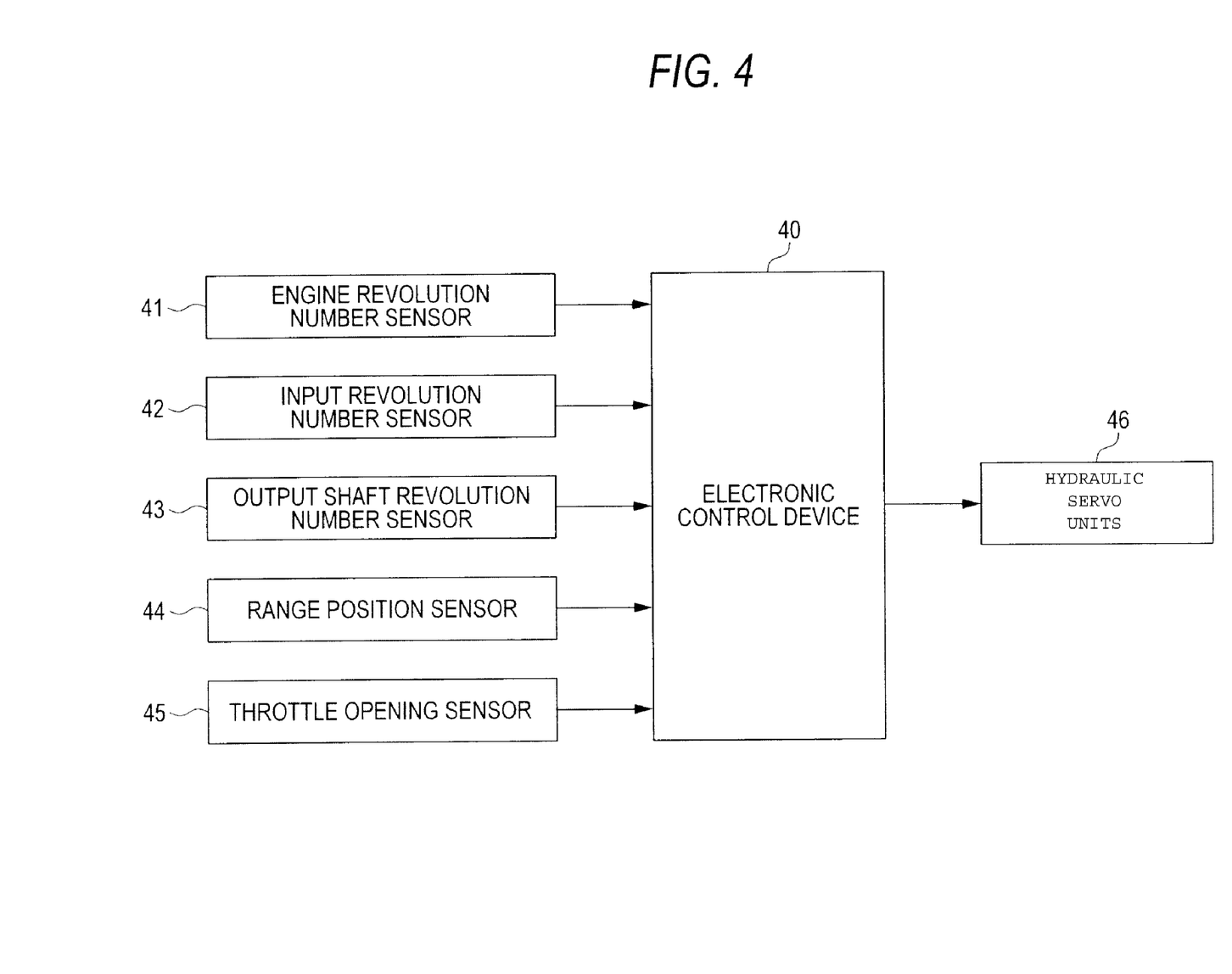
FIG. 4 is a block diagram showing a control device consistent with an exemplary embodiment of the present invention.

The control device of the automatic transmission 10 consistent with an exemplary embodiment of the present invention is described with reference to the block diagram of FIG. 4. The control device 40 having a CPU built therein is fed with individual detection signals by an engine revolution number sensor 41 for detecting the engine side revolution number Ne of the torque converter 11, to which the revolutions of the engine are transmitted, an input revolution number sensor 42 for detecting the revolution number Ni of the input shaft 14, an output shaft revolution number sensor 43 for detecting the revolution number Nv of the output shaft 17, a range position sensor 44 for sending detection signals D, N and R when the shift lever is shifted to a drive range D, a neutral range N and a reverse range R, and a throttle opening sensor 45 for detecting the stroke of depression Ss of an accelerator. Using the aforementioned detection signals, the control device 40 selects the optimum gear, outputs a control current to individual hydraulic servo units 46 for actuating individual clutches and brakes, and engages the first to fifth clutches C-1 to C-5 and the first and second brakes B-1 and B-2, selectively, as tabulated in the operation table of FIG. 2, to thereby establish the ten forward gears and the two reverse gears.

The first gear (1st) is achieved by the engagement of the first clutch C-1 by the control device 40 and by the automatic engagement of the one-way clutch F-1. The revolutions of the input shaft 14 are directly inputted to the speed-reducing common carrier C0C1 of the speed-reducing planetary gear 15, and the second sun gear S1 is fixed, so that the reduced revolutions of the speed-reducing common ring gear R0R1 are inputted through the first clutch C-1 to the fourth sun gear S3 of the speed-changing dual planetary gear 16. The speed-changing common carrier C2C3 are blocked from reverse revolutions by the one-way clutch F-1 to receive the reaction, so that the speed-changing common ring gear R2R3, or accordingly the output shaft 17, is forward rotated at the speed of the input shaft 14 reduced at the ratio of the first gear.

In case the engine is used downhill as the brake, the revolution number, as transmitted from the drive wheels through the speed-changing common ring gear R2R3 to the speed-changing common carrier C2C3, exceeds the revolution number transmitted from the engine side, so that the direction of the reaction to act on the speed-changing common carrier C2C3 rotates reversely. When the engine is used as the brake, therefore, the speed-changing common carrier C2C3 is fixed, as indicated by ▲ in FIG. 2, by the engagement of the second brake B-2.

The second gear (2nd) is achieved by the engagements of the first and fifth clutches C-1 and C-5. The revolutions, as decelerated from the revolutions of the input shaft 14 by the speed-reducing dual planetary gear 15, of the speed-reducing common ring gear R0R1 are inputted through the first clutch C-1 to the fourth sun gear S3 of the speed-changing dual planetary gear 16, and the decelerated and reversed revolutions of the first sun gear S0 are inputted through the fifth clutch C-5 to the third sun gear S2. As a result, the speed-changing common ring gear R2R3, or accordingly the output shaft 17, is forward rotated by the revolutions which are decelerated at the ratio of the second gear from the revolutions of the input shaft 14.

The third gear (3rd) is achieved by the engagements of the first clutch C-1 and the first brake B-1. The revolutions, as decelerated from the revolutions of the input shaft 14 by the speed-reducing dual planetary gear 15, of the speed-reducing common ring gear R0R1 are inputted through the first clutch C-1 to the fourth sun gear S3 of the speed-changing dual planetary gear 16, and the third sun gear S2 is fixed through the first brake B-1. As a result, the speed-changing common ring gear R2R3, or accordingly the output shaft 17, is forward rotated by the revolutions which are decelerated at the ratio of the third gear from the revolutions of the input shaft 14.

The fourth gear (4th) is achieved by the engagements of the first and third clutches C-1 and C-3. The revolutions, as decelerated from the revolutions of the input shaft 14 by the speed-reducing dual planetary gear 15, of the speed-reducing common ring gear R0R1 are inputted through the first clutch C-1 to the fourth sun gear S3 of the speed-changing dual planetary gear 16, and are inputted through the third clutch C-3 to the third sun gear S2. As a result, the speed-changing dual planetary gear 16 is integrally rotated, and the speed-changing common ring gear R2R3, or accordingly the output shaft 17, is forward rotated by the revolutions which are decelerated at the ratio of the fourth gear from the revolutions of the input shaft 14.

The fifth gear (5th) is achieved by the engagements of the first and fourth clutches C-1 and C-4. The revolutions, as decelerated from the revolutions of the input shaft 14 by the speed-reducing dual planetary gear 15, of the speed-reducing common ring gear R0R1 are inputted through the first clutch C-1 to the fourth sun gear S3 of the speed-changing dual planetary gear 16, and the revolutions of the speed-reducing common carrier C0C1 connected directly to the input shaft 14 are inputted through the fourth clutch C-4 to the third sun gear S2. As a result, the speed-changing common ring gear R2R3, or accordingly the output shaft 17, is forward rotated by the revolutions which are decelerated at the ratio of the fifth gear from the revolutions of the input shaft 14.

The sixth gear (6th) is achieved by the engagements of the first and second clutches C-1 and C-2. The revolutions, as decelerated from the revolutions of the input shaft 14 by the speed-reducing dual planetary gear 15, of the speed-reducing common ring gear R0R1 are inputted through the first clutch C-1 to the fourth sun gear S3 of the speed-changing dual planetary gear 16, and the revolutions of the input shaft 14 are inputted through the second clutch C-2 to the speed-changing common carrier C2C3. As a result, the speed-changing common ring gear R2R3, or accordingly the output shaft 17, is forward rotated by the revolutions which are decelerated at the ratio of the sixth gear from the revolutions of the input shaft 14.

The seventh gear (7th) is achieved by the engagements of the second and fourth clutches C-2 and C-4. The revolutions of the input shaft 14 are transmitted by the engagement of the fourth clutch C-4 through the speed-reducing common carrier C0C1 of the speed-reducing dual planetary gear 15 to the third sun gear S2 of the speed-changing dual planetary gear 16, and are transmitted through the second clutch C-2 to the speed-changing common carrier C2C3. As a result, the speed-changing dual planetary gear 16 is integrally rotated, and the speed-changing common ring gear R2R3, or accordingly the output shaft 17, is forward rotated at the same speed as that of the input shaft 14.

The eighth gear is achieved by the engagements of the second and third clutches C-2 and C-3. The revolutions, as decelerated from the revolutions of the input shaft 14 by the speed-reducing dual planetary gear 15, of the speed-reducing common ring gear R0R1 are inputted through the third clutch C-3 to the third sun gear S2 of the speed-changing dual planetary gear 16, and the revolutions of the input shaft 14 are inputted through the second clutch C-2 to the speed-changing common carrier C2C3. As a result, the speed-changing common ring gear R2R3, or accordingly the output shaft 17, is forward rotated by the revolutions which are accelerated at the ratio of the eighth gear from the revolutions of the input shaft 14.

The ninth gear is achieved by the engagements of the second clutch C-2 and the first brake B-1. The revolutions of the input shaft 14 are inputted through the second clutch C-2 to the speed-changing common carrier C2C3 of the speed-changing dual planetary gear 16, and the third sun gear S2 is fixed through the first brake B-1. As a result, the speed-changing common ring gear R2R3, or accordingly the output shaft 17, is forward rotated by the revolutions which are accelerated at the ratio of the ninth gear from the revolutions of the input shaft 14.

The tenth gear is achieved by the engagements of the second and fifth clutches C-2 and C-5. The revolutions, as decelerated and reversed from the revolutions of the input shaft 14 by the speed-reducing dual planetary gear 15, of the first sun gear S0 are inputted through the fifth clutch C-5 to the third sun gear S2 of the speed-changing dual planetary gear 16, and the revolutions of the input shaft 14 are inputted through the second clutch C-2 to the speed-changing common carrier C2C3. As a result, the speed-changing common ring gear R2R3, or accordingly the output shaft 17, is forward rotated by the revolutions which are accelerated at the ratio of the tenth gear from the revolutions of the input shaft 14.

The reverse first gear (Rev1) is achieved by the engagements of the third clutch C-3 and the second brake B-2. The revolutions, as decelerated from the revolutions of the input shaft 14 by the speed-reducing dual planetary gear 15, of the speed-reducing common ring gear R0R1 are transmitted through the third clutch C-3 to the third sun gear S2 of the speed-changing dual planetary gear 16, and the speed-changing common carrier C2C3 is fixed through the second brake B-2. As a result, the speed-changing common ring gear R2R3, or accordingly the output shaft 17, is reversely rotated by the revolutions which are decelerated at the ratio of the reverse first gear from the revolutions of the input shaft 14.

The reverse second gear (Rev2) is achieved by the engagements of the fourth clutch C-4 and the second brake B-2. The revolutions of the speed-reducing common carrier C0C1 connected directly to the input shaft 14 are inputted through the fourth clutch C-4 to the third sun gear S2 of the speed-changing dual planetary gear 16, and the speed-changing common carrier C2C3 is fixed through the second brake B-2. As a result, the speed-changing common ring gear R2R3, or accordingly the output shaft 17, is reversely rotated by the revolutions which are decelerated at the ratio of the reverse second gear from the revolutions of the input shaft 14.

The individual gear ratios of the first and second double-pinion planetary gears 36 and 37 of the speed-reducing dual planetary gear 15, and the individual gear ratios $\lambda0$, $\lambda1$, $\lambda2$ and $\lambda3$ of the third single-pinion planetary gear 38 and the fourth double-pinion planetary gear 39 of the speed-changing dual planetary gear 16, are set to 0.320, 0.485, 0.390 and 0.365, for example, and the gear ratios of the individual gears are calculated using Formulas (1) and (2). Then, the rotation ratios between the input shaft 14 and the output shaft 17 at the individual gears, that is the gear ratios, take 5.320 at the first gear, 3.861 at the second gear, 2.890 at the third gear, 1.942 at the fourth gear, 1.483 at the fifth gear, 1.215 at the sixth gear, 1.000 at the seventh gear, 0.841 at the eighth gear, 0.719 at the ninth gear and 0.628 at the tenth gear. Moreover, the steps between the individual gear ratios are 1.378 between the first and second gears, 1.336 between the second and third gears, 1.488 between the third and fourth gears, 1.309 between the fourth and fifth gears, 1.221 between the fifth and sixth gears, 1.215 between the sixth and seventh gears, 1.189 between the seventh and eighth gears, 1.169 between the eighth and ninth gears and 1.145 between the ninth and tenth gears. These gear ratios are reduced at proper rates for the individual gears so that the properly separated forward ten gears and reverse two gear ratios can be acquired by the automatic transmission according to the first exemplary embodiment of the invention. As a result, the driver can acquire such an excellent feeling that the speeds are changed with little dispersion for all the ten gears so that the desired revolution number ranges for the engine can be effectively used.

Figure 5:
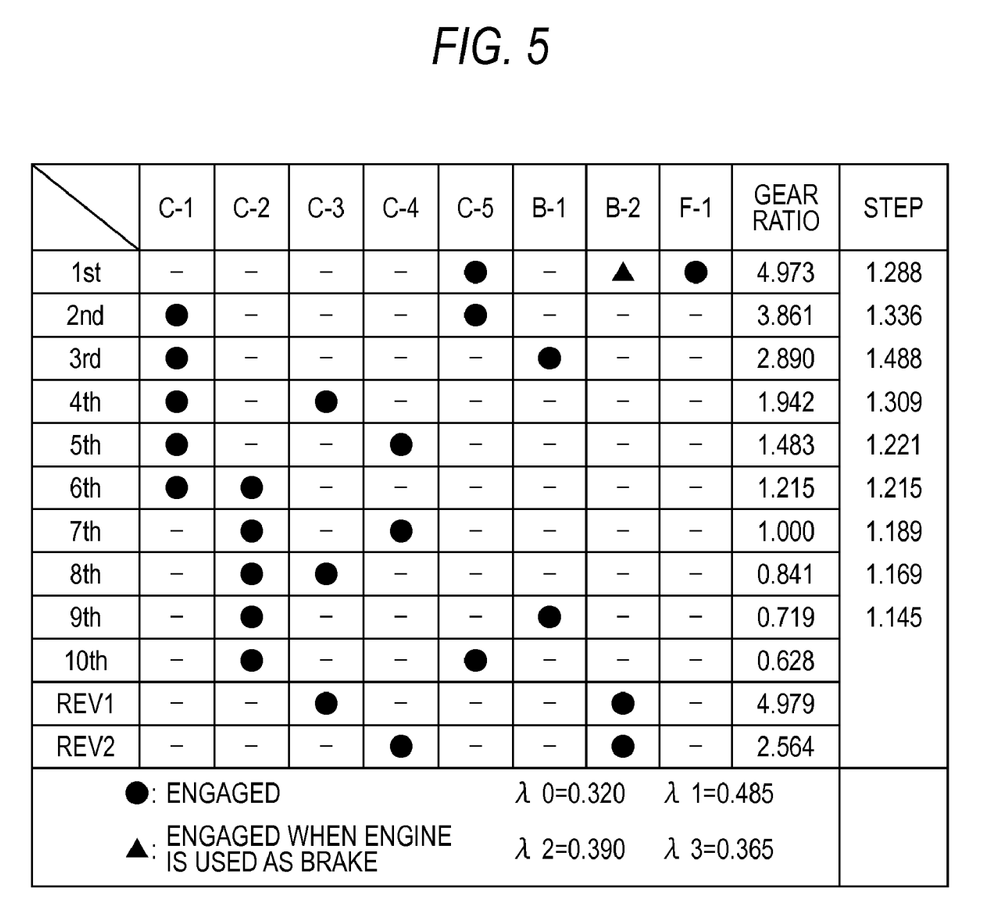
FIG. 5 is a diagram showing another example of an operation table of the brakes and the clutches at the individual gears of the first exemplary embodiment of the present invention.
Figure 6:
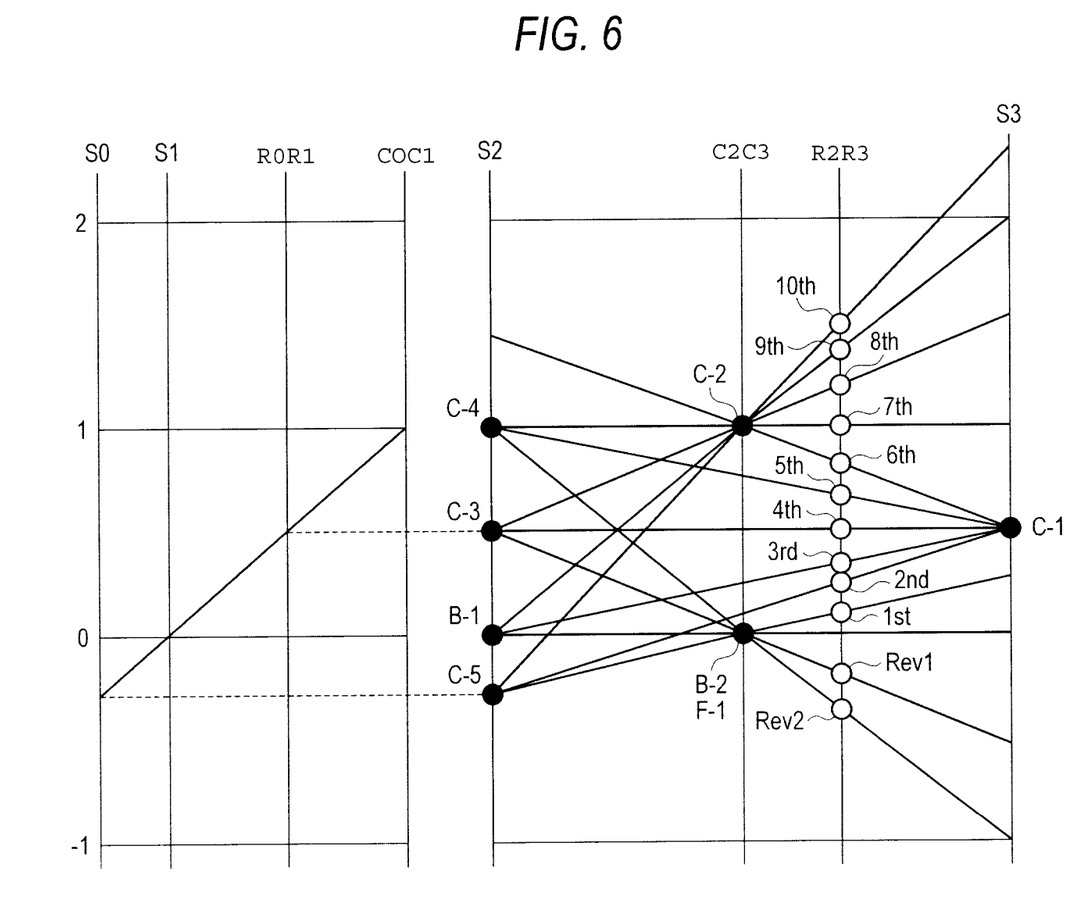
FIG. 6 is a speed diagram of the case, in which the clutches and the brakes are actuated on the basis of the operation table shown in FIG. 5 consistent with an exemplary embodiment of the present invention.

Consistent with the first exemplary embodiment of the invention, as shown in the operation table shown in FIG. 5, the first gear (1st) may be achieved by the engagement of the fifth clutch C-5 and the automatic engagement of the one-way clutch F-1. In this case, as in the speed diagram shown in FIG. 6, the revolutions of the input shaft 14 are directly inputted to the speed-reducing common carrier C0C1 of the speed-reducing dual planetary gear 15, and the revolutions, as speed-reduced and reversed, of the first sun gear S0 are inputted through the fifth clutch C-5 to the third sun gear S2 of the speed-changing dual planetary gear 16, so that the speed-changing common carrier C2C3 are blocked from the reverse revolutions to receive the reaction by the one-way clutch F-1. As a result, the speed-changing common ring gear R2R3, or accordingly the output shaft 17, is forward rotated while being reduced in speed at the gear ratio of the first gear. When the engine is used as the brake while the vehicle is running at the first gear, the speed-changing common carrier C2C3 is fixed, as indicated by ▲ in FIG. 5, by the engagement of the second brake B-2. The gears other than the first gear are identical to those of the operation table of FIG. 2.

In this case, the individual gear ratios of the first and second double-pinion planetary gears 36 and 37 of the speed-reducing dual planetary gear 15 and the individual gear ratios $\lambda0$, $\lambda1$, $\lambda2$ and $\lambda3$ of the third single-pinion planetary gear 38 and the fourth double-pinion planetary gear 39 of the speed-changing dual planetary gear 16 are set at the same ones as those of the first exemplary embodiment. Then, the gear ratio of the first gear is a proper value of 4.973, and the step between the first and second gears is a proper value of 1.288. The gear ratios of the remaining gears and the steps between the remaining gears are identical to those of the first exemplary embodiment.

Figure 7:
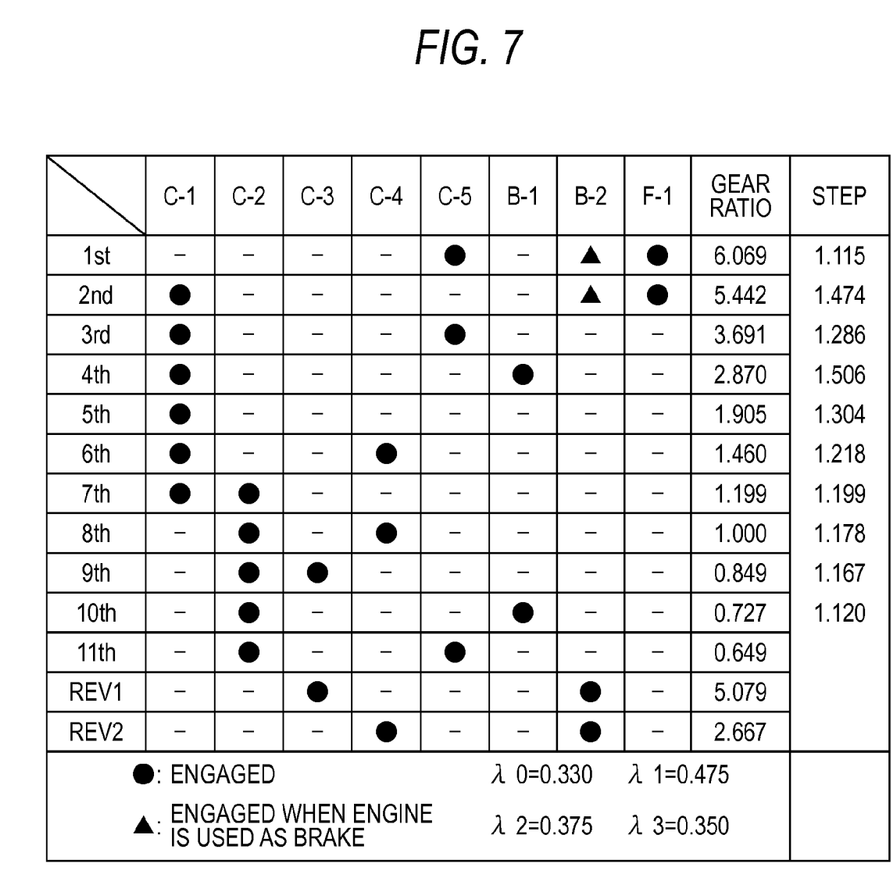
FIG. 7 is a diagram showing an operation table of the brakes and the clutches at the individual gears of a second exemplary embodiment of the present invention.

In the schematic diagram shown in FIG. 1, according to a second exemplary embodiment of the present invention, the first gear (1st) is achieved by the engagement of the fifth clutch C-5 and the automatic engagement of the one-way clutch F-1; the second gear (2nd) is achieved by the engagement of the first clutch C-1 and by the automatic engagement of the one-way clutch F-1, according to the operation table shown in FIG. 7. As shown FIG. 7, the third and higher gears are achieved by engaging the respective clutches and the respective brakes such that the second and higher gears in the operation table of FIG. 2 are lowered by one gear, thereby to achieve the forward eleven gears and the reverse two gears.

Figure 8:
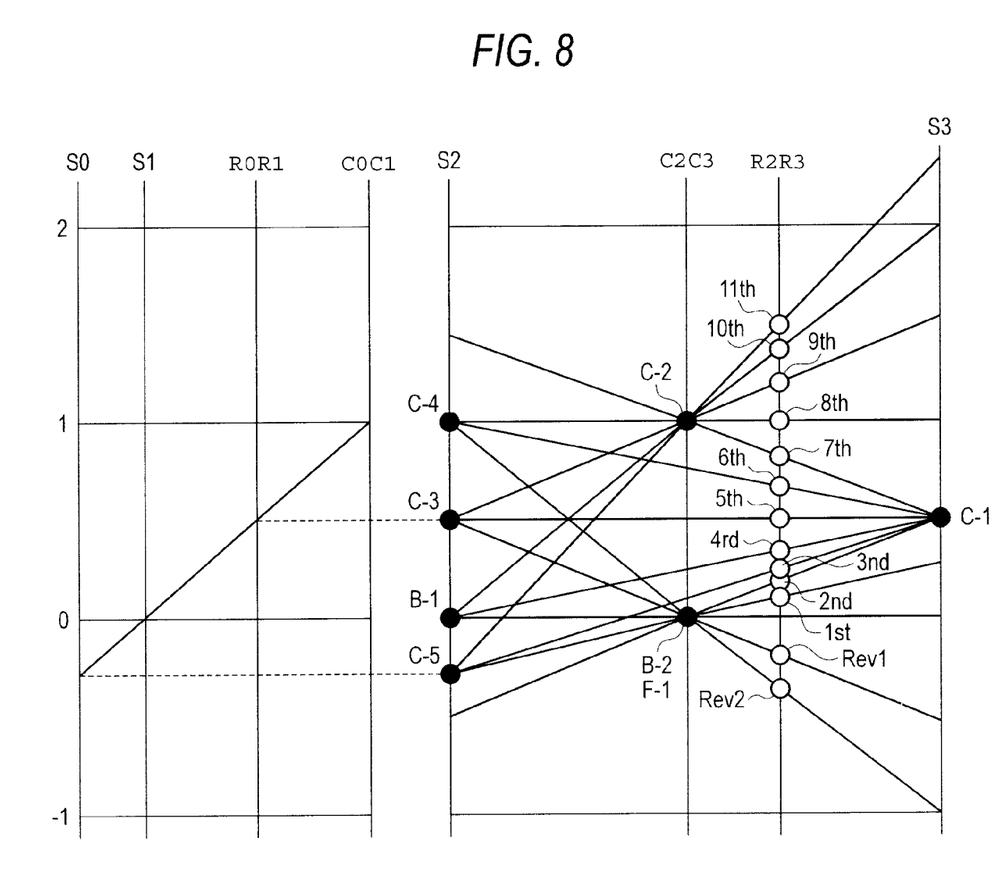
FIG. 8 is a speed diagram showing the revolution ratios of the individual elements of a planetary gear at the individual gears consistent with the second exemplary embodiment of the present invention.

At the first gear, according to the speed diagram shown in FIG. 8, the revolutions of the input shaft 14 are directly inputted to the speed-reducing common carrier C0C1 of the speed-reducing planetary gear 15, and the decelerated and reversed revolutions of the first sun gear S0 are inputted through the fifth clutch C-5 to the third sun gear S2 of the speed-changing dual planetary gear 16, so that the speed-changing common carrier C2C3 is blocked from reverse revolutions by the one-way clutch F-1 to receive the reaction. As a result, the speed-changing common ring gear R2R3, or accordingly the output shaft 17, is forward rotated by the revolutions which are decelerated at the ratio of the first gear from the revolutions of the input shaft 14. When the engine is used as the brake while the vehicle is running at the first gear, the speed-changing common carrier C2C3 is fixed, as indicated by ▲ in FIG. 8, by the engagement of the second brake B-2.

At the second gear (2nd), the revolutions of the speed-reducing common ring gear R0R1, which are decelerated from the revolutions of the input shaft 14 by the speed-reducing dual planetary gear 15, are inputted through the first clutch C-1 to fourth sun gear S3 of the speed-changing dual planetary gear 16, and the speed-changing common carrier C2C3 is blocked from reverse revolutions by the one-way clutch F-1 to receive the reaction. As a result, the speed-changing common ring gear R2R3, or accordingly the output shaft 17, is forward rotated by the revolutions which are decelerated at the ratio of the second gear from the revolutions of the input shaft 14. When the engine is used as the brake while the vehicle is running at the second gear, the speed-changing common carrier C2C3 is fixed, as indicated by ▲ in FIG. 8, by the engagement of the second brake B-2.

The third gear (3rd) is achieved, as indicated by the operation table of FIG. 8, like the second gear (2nd) of the first exemplary embodiment, by the engagements of the first and fifth clutches C-1 and C-5. Likewise in the following, the individual clutches C-1 to C-5 and the brakes B-1 and B-2 are selectively engaged with the individual gears shown in the operation table of FIG. 2 being lowered by one, to thereby achieve the fourth gear to the eleventh gear.

The individual gear ratios of the first and second double-pinion planetary gears 36 and 37 of the speed-reducing dual planetary gear 15 and the individual gear ratios λ0, λ1, λ2 and λ3 of the third single-pinion planetary gear 38 and the fourth double-pinion planetary gear 39 of the speed-changing dual planetary gear 16 are set to 0.330, 0.475, 0.375 and 0.350, for example, and the gear ratios of the individual gears are calculated using Formulas (1) and (2). Then, that is, the gear ratios at the individual gears take values of 6.069 at the first gear, 5.442 at the second gear, 3.691 at the third gear, 2.870 at the fourth gear, 1.905 at the fifth gear, 1.460 at the sixth gear, 1.199 at the seventh gear, 1,000 at the eighth gear 0.849 at the ninth gear, 0.727 at the tenth gear, and 0.649 at the eleventh gear. Moreover, the steps between the individual gear ratios are 1.115 between the first and second gears, 1.474 between the second and third gears, 1.286 between the third and fourth gears, 1.506 between the fourth and fifth gears, 1.304 between the fifth and sixth gears, 1.218 between the sixth and seventh gears, 1.199 between the seventh and eighth gears, 1.178 between the eighth and ninth gears, 1.167 between the ninth and tenth gears, and 1.120 between the tenth and eleventh gears.

Consistent with the second exemplary embodiment, the gear ratio of the first gear is 6.069, and the gear ratio of the second gear is 5.442, so that the step between the gear ratios is as small as 1.115. In the first exemplary embodiment, therefore, one of the first gear and the second gear is used as the first gear, but the other is not used to establish he forward ten gears. In the second exemplary embodiment, however, the ordinary start is performed at the second gear, and the first gear is employed when a special torque is needed, so that the automatic transmission can achieve the forward eleven gears.

The automatic transmission according to exemplary embodiments of the present invention is suitably used as an automatic transmission, in which the revolutions of an input shaft driven rotationally by a prime mover of an automobile are changed in speed at a plurality of gears by the engagements/disengagements of clutches and brakes.

It is contemplated that numerous modifications may be made to the exemplary embodiments of the invention without departing from the spirit and scope of the embodiments of the present invention as defined in the following claims.

What is claimed is:
1. An automatic transmission comprising:
an input shaft;
a speed-reducing dual planetary gear comprising:
a speed-reducing common carrier bearing rotatably a stepped pinion, having a diametrically-larger pinion portion and a diametrically-smaller pinion portion, and a first pinion meshing with said diametrically-smaller pinion portion and connected directly to said input shaft;
a first sun gear meshing with said diametrically-larger pinion portion;
a second sun gear meshing with said diametrically-smaller pinion portion; and
a speed-reducing common ring gear meshing with said first pinion;
a speed-changing dual planetary gear comprising:
a speed-changing common carrier bearing rotatably a long pinion and a second pinion meshing with said long pinion and configured to connect to said input shaft;
a third sun gear meshing with said long pinion;
a fourth sun gear meshing with said second pinion; and
a speed-changing common ring gear meshing with said long pinion;
an output shaft connected directly to said speed-changing common ring gear;
a first clutch configured to selectively connect said speed-reducing common ring gear and said fourth sun gear;
a second clutch configured to selectively connect said input shaft and said speed-changing common carrier;
a third clutch configured to selectively connect said speed-reducing common ring gear and said third sun gear;
a fourth clutch configured to selectively connect said speed-reducing common carrier and said third sun gear;

a fifth clutch configured to selectively connect said first sun gear and said third sun gear;

a first brake configured to selectively fix said third sun gear; and a second brake configured to selectively fix said speed-changing common carrier.

2. The automatic transmission according to claim 1, wherein the automatic transmission is configured to provide at least ten forward gears.

3. The automatic transmission according to claim 1, wherein the automatic transmission is configured to provide at least eleven forward gears.

4. The automatic transmission according to claim 1, wherein the automatic transmission is configured to provide at least two reverse gears.

5. The automatic transmission according to claim 1, wherein the automatic transmission is configured such that the first sun gear, the speed-reducing common carrier, and the speed-reducing common ring gear comprise a first double-pinion planetary gear, wherein the automatic transmission is configured such that the second sun gear, the speed-reducing common carrier, and the speed-reducing common ring gear comprise a second double-pinion planetary gear, wherein the automatic transmission is configured such that the fourth sun gear, the speed-changing common carrier, and the speed-changing common ring gear comprise a fourth double-pinion planetary gear, wherein the automatic transmission is configured such that gear ratios $\lambda$ of a respective one of the first double-pinion planetary gear, the second double-pinion planetary gear, and the fourth double-pinion planetary gear are provided by a first expression $Nr=(1-\lambda)Nc+\lambda Ns$, wherein Ns expresses a revolution number of a respective one of the first sun gear, the second sun gear and the fourth sun gear, wherein Nc expresses a revolution number of a respective one of the speed-reducing common carrier and the speed-changing common carrier, and wherein Nr expresses a revolution number of a respective one of the speed-reducing common ring gear and the speed-changing common ring gear.

6. The automatic transmission according to claim 1, wherein the automatic transmission is configured such that the third sun gear, the speed-changing common carrier, and the speed-changing common ring gear comprise a third single-pinion planetary gear, wherein the automatic transmission is configured such that gear ratios $\lambda$ of the third single-pinion planetary gear are provided by a second expression $Nr=(1+\lambda)Nc-\lambda Ns$, wherein Ns expresses a revolution number of the third sun gear, wherein Nc expresses a revolution number of the speed-changing common carrier, and wherein Nr expresses a revolution number of the speed-changing common ring gear.

7. The automatic transmission according to claim 2, wherein the automatic transmission is configured such that steps between respective gear ratios are approximately:
1.378 between first and second gears;
1.336 between second and third gears;
1.488 between third and fourth gears;
1.309 between fourth and fifth gears;
1.221 between fifth and sixth gears;
1.215 between sixth and seventh gears;
1.189 between seventh and eighth gears;
1.169 between eighth and ninth gears; and
1.145 between ninth and tenth gears.

8. The automatic transmission according to claim 2, wherein the automatic transmission is configured such that steps between respective gear ratios are approximately:
1.288 between first and second gears;
1.336 between second and third gears;
1.488 between third and fourth gears;
1.309 between fourth and fifth gears;
1.221 between fifth and sixth gears;
1.215 between sixth and seventh gears;
1.189 between seventh and eighth gears;
1.169 between eighth and ninth gears; and
1.145 between ninth and tenth gears.

9. The automatic transmission according to claim 1, further comprising a one-way clutch configured to selectively connect the speed-changing common carrier to a case of the automatic transmission so as to block the speed-changing common carrier from reverse revolution.

10. The automatic transmission according to claim 3, wherein the automatic transmission is configured such that steps between respective gear ratios are approximately:
1.115 between first and second gears;
1.474 between second and third gears;
1.286 between third and fourth gears;
1.506 between fourth and fifth gears;
1.304 between fifth and sixth gears;
1.218 between sixth and seventh gears;
1.199 between seventh and eighth gears;
1.178 between eighth and ninth gears;
1.167 between ninth and tenth gears; and
1.120 between the tenth and eleventh gears.

* * * * *